E. S. PRIME.
Wantage-Rod.
No. 206,259.　　　　Patented July 23, 1878.
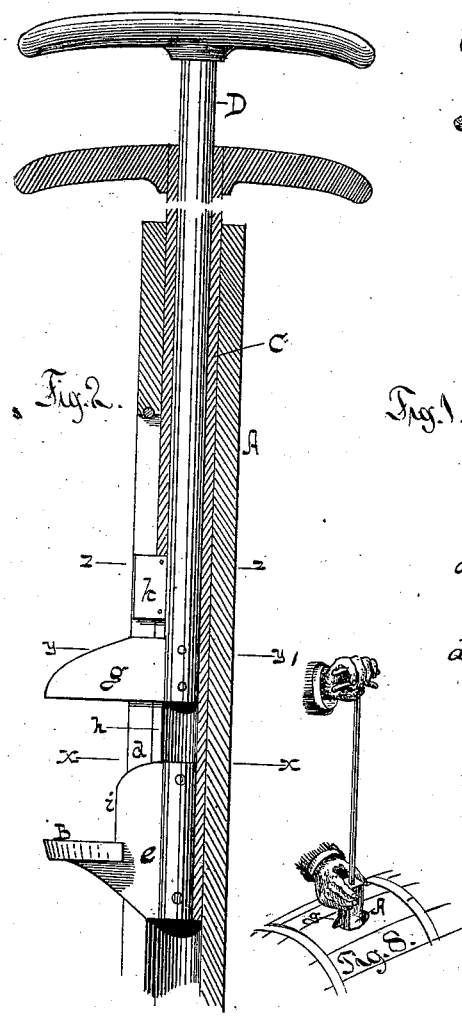
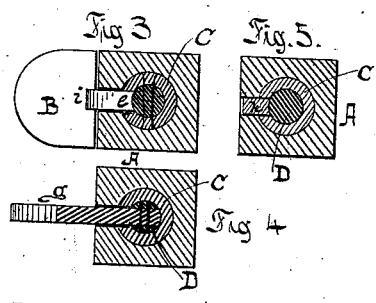
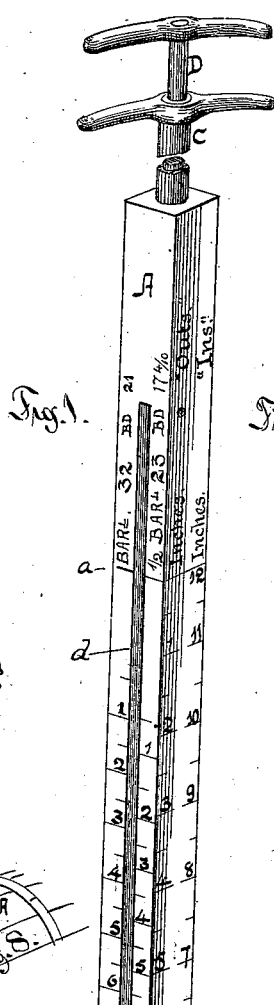
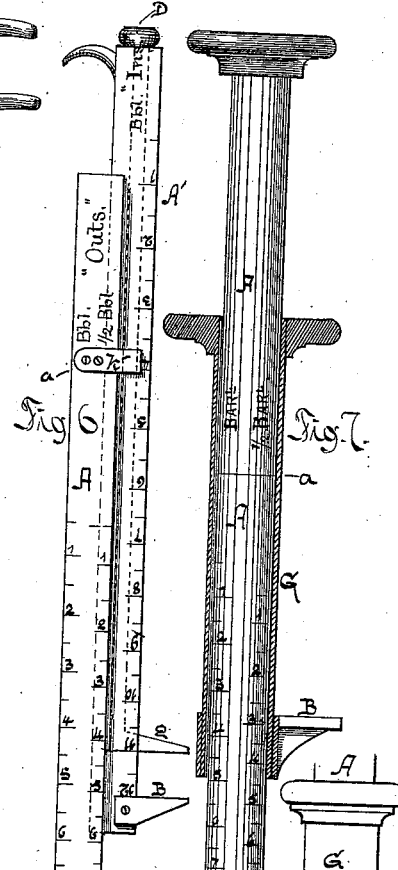
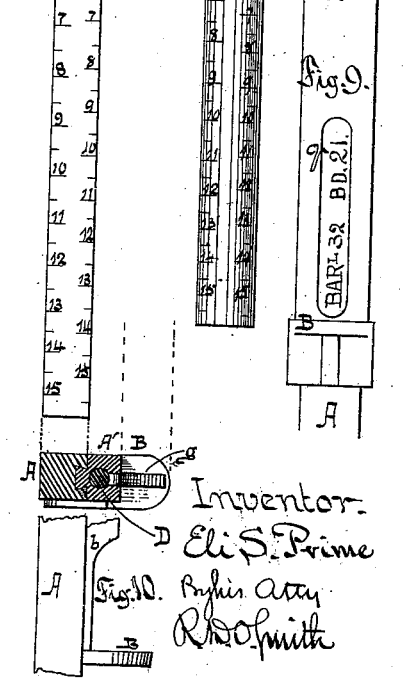
Attest.
A. B. Smith
Aug. Jordan
Inventor.
Eli S. Prime
By his Atty
R. D. O. Smith

UNITED STATES PATENT OFFICE

ELI S. PRIME, OF BALTIMORE, MARYLAND.

IMPROVEMENT IN WANTAGE-RODS.

Specification forming part of Letters Patent No. 206,259, dated July 23, 1878; application filed May 14, 1878.

*To all whom it may concern:*

Be it known that I, ELI S. PRIME, of Baltimore, in the county of Baltimore and State of Maryland, have invented a new and useful Improvement in Wantage-Rods, of which the following is a specification:

In gaging liquids in casks two sets of instruments are required: first, to measure the capacity of the casks; and, second, to measure the portion of the cask actually occupied by the liquid.

If the cask is nearly filled, the unfilled space is measured, and the instrument is called an "out-stick" or "wantage-rod." If the cask is less than half-full the depth of the liquid under the bung is measured by the "in-stick." These two rods have not heretofore been united in a single instrument.

The out-stick or wantage-rod is provided with a projecting gage-lip and a scale reading therefrom. In using this instrument it is inserted at the bung and the gage-lip carefully slipped against the inner surface of the stave. The end of the instrument is then below the surface of the liquid, and upon withdrawing it the reading is made at the wet-line. It is easy to perceive that great care is required to avoid inserting the rod too far, in which case the reading would indicate an out-space less than the fact, and consequently give too large a quantity of contents.

In ascertaining the quantity in the barrel (when less than half-full) a simple rod graduated from the end is used. It is inserted until it rests against the stem opposite the bung. The reading is made at the wet-line, as before, but without the same liability to error. It is, however, inconvenient to have two separate instruments to guard and care for, if the functions of both can be combined in one.

The principal object of my invention is to obviate the source of inaccuracy mentioned above in taking the wantage, and the secondary object is to combine the two instruments in one to avoid the inconvenience mentioned above.

My invention therefore consists, first, in a scale, suitably graduated from a zero-point, for the wantage, with a projecting lip, to be at the zero-point, but movable as to said scale, so that the zero-point of said scale may be moved up above the gage-lip until the same lip has been put in place within the bung, and then caused to slide down to position whereby the scale will not be wet above the true line nor give a false reading without gross carelessness on the part of the operator; second, in a scale properly graduated as a wantage-rod, reading from a zero-point, and provided with a scale reading from one end, and properly graduated to measure the "ins," or quantity within the cask; third, in the mechanical devices whereby the gage-lip is made movable as to the scale; fourth, in mechanical arrangements whereby the instrument may be clamped to the stave at the bung while the measurement is being perfected.

That others may understand my invention fully, I will particularly describe it, having reference to the accompanying drawings, wherein—

Figure 1 is a perspective view of the instrument in the form preferred by me. Fig. 2 is a longitudinal central section of the same. Fig. 3 is a cross-section on line $x\,x$. Fig. 4 is a cross-section on line $y\,y$. Fig. 5 is a cross-section on line $z\,z$. Figs. 6, 7, 9, 10 represent modifications of structure. Fig. 8 is a perspective, showing the method of use.

A is a straight wooden rod, angular or cylindrical in cross-section. Preferably it has four sides or faces, as shown, and two or more scales may be inscribed on each face. For the purposes of a wantage-rod these scales read from a zero-mark, $a$, which is at a distance of four inches, or thereabout, from the upper end of the rod, so that when the rod is inserted in the bung with the zero-mark opposite the lower edge of the stave the upper end will project out of the bung-hole far enough to be conveniently grasped by the hand.

The lip B is a gage, which, when the rod is in use, is rested against the under side of the bung-stave, so as to insure a measurement from the inner surface of the barrel; and I make this lip movable as to the scale, so that the setting of the lip in position on the stave shall be a separate and distinct operation from the setting of the scale to obtain the measurement of the unfilled portion of the barrel, and thereby avoid a false reading of the scale by reason of carelessness or accident in setting the gage in position, as above set forth. This result may be accomplished in many ways, some of which are shown in the drawings; but the method preferred is shown in Figs. 1, 2, and 8. The rod A, as shown in said figures, is perforated axially, and a tube, C, is fitted to slide freely yet snugly thereon. Along a median line on one of the sides or faces a slot, d, is made for the arm e, which, at its inner end, is rigidly attached to the tube C, and at its outer end to the gage-lip B. By these means the rod A is made movable as to the tube C, which carries the gage-lip B, and may be moved, with the zero-point a high above said gage-lip, until the latter is adjusted in position.

A rod, D, is fitted to slide within the tube C, and at its lower end a foot-piece, g, is attached, and caused to project through a slot, h, made in the lower end of the tube C, so that said foot-piece may have a limited movement up and down in said slot. The foot-piece g projects through the slot d to a distance about equal to the projection of the lip B, so that as it is moved it may clamp or release any object between itself and B, as the case may be. Handle-pieces are placed at the upper ends of C and D, severally, for the convenient manipulation of the parts, one method being shown in Fig. 8. The arm e has a fin or projecting edge, i, above the lip B, which prevents contact between the scale-rod A and the barrel-stave.

At the upper end of the slot h a stop-piece, k, is rigidly secured to the tube C to engage with the upper end of the slot d, and thus limit in one direction the movement of the gage-lip B; and said stop k is so adjusted as to the end of said slot as to limit said movement exactly and stop the gage-point when it has reached the zero-line a. The slot d is continued throughout nearly the whole length A, so that the tube C and rod D may be entirely housed within said rod when the instrument is not in use.

For the purpose of a wantage-rod only, the movement of the lip B and foot g as to said rod may be limited to two or three inches; but if, as I propose, when occasion requires, to employ the same instrument to measure the depth of liquid in the barrel, it is necessary to elongate it much beyond the length necessary as a wantage-rod, and I do this by providing a longer tube, C, and rod D, and, for convenience only, perforate the wantage-rod through its whole length, so that when not in use the said parts may be entirely housed.

To use this instrument as an in-stick, it is inserted through the bung-hole until its inner end rests upon the stave opposite. It is then withdrawn, and the depth of liquid read at the wet-line, as before. It is then necessary to provide a scale graduated from said inner end of the rod; but as convenience requires that scales shall designate gallons, and that each rod shall have several of these scales to adapt it to different varieties of casks, it would frequently be inconvenient to duplicate these scales. I therefore inscribe upon one face two scales, S, of inches or other equal parts, one of said scales reading from the end of the rod and the other from the zero-line a. The wet-line is read on the first-named, and, by means of the second, is readily transferred to the gallon-scale of the proper variety.

In Fig. 6 is shown a modification in structure, two similar rods, A A', being used, one graduated from the end and the other from a zero-mark at a distance from the end. These rods are fitted to slide upon each other, and one of them carries the lip B and the other a stop, k'. When used as an in-stick, the parts are drawn as far asunder as possible, and inserted in the barrel in a reversed position. In this case similar scales of gallons may be inscribed on each rod, and the reading will be in gallons directly.

The bung-holes are sometimes very small. In Fig. 10 is shown a method of decreasing the size of the rod at the point where it passes through the bung-hole, by putting at the end of rod A' a metallic extension, b, of less diameter than the rod, and attach the lip B to the lower end of it.

In Figs. 7 and 9 is shown a simple arrangement for a wantage-rod sliding through a tube, G, which has at its lower end the gage-lip B.

An opening, q, may be made in the side of the tube G, to expose the inscription which indicates the proper variety, and thus renders it less likely that the reading will be made on the wrong scale.

Figs. 1, 6, and 7 indicate the various typical forms of this instrument.

Having thus described my invention, what I claim as new, and desire to secure by Letters Patent, is—

1. A wantage-rod provided with one or more suitable scales reading from the same zero-line, and movable as to a projecting gage-lip, so that it may be moved out of position until said gage-lip has been adjusted to the stave, and then moved into position to obtain a true reading of the wet-line.

2. A wantage-rod provided with one or more suitable scales reading from the same zero-line, combined with a slide bearing a gage-lip, whereby the scale may be moved out of adjustment while the instrument is being arranged in position, and then moved into adjustment to obtain a true reading of the wet-line.

3. A wantage-rod provided with one or more suitable scales reading from the same zero-point, constructed with an axial hole and a longitudinal slot penetrating to said hole, combined with a sliding rod, $x$, fitted to said hole, and a gage-lip, which is fixed to said rod and projects through said slot, as set forth.

4. A wantage-rod provided with one or more suitable scales reading from the same zero-line, and also provided with an addition scale or scales of suitable graduation reading from one end of said rod, so that the same instrument may be employed to measure both "outs" and "ins," as desired.

ELI S. PRIME.

Witnesses:
R. D. O. SMITH,
JOHN D. PATTEN.